United States Patent [19]
Zapart

[11] 3,829,108
[45] Aug. 13, 1974

[54] COLLET-TRUING DEVICE
[76] Inventor: Bruno J. Zapart, Rt. 2, Box 161, Doniphan, Mo. 63935
[22] Filed: June 29, 1972
[21] Appl. No.: 267,533

[52] U.S. Cl. ............... 279/1 L, 279/1 J, 279/49
[51] Int. Cl. ............................................ B23b 31/20
[58] Field of Search ............ 279/1 A, 1 L, 1 J, 42, 279/43, 48, 49, 50, 56, 57; 82/45; 85/50 R

[56] References Cited
UNITED STATES PATENTS
1,883,713  10/1932  Gray .................................. 279/1 L
2,478,195  8/1949  Hull ................................... 279/1 A
3,544,117  12/1970  Bingham .......................... 279/1 L
D29,023  7/1898  Read ................................. 85/50 R Primary Examiner—Andrew R. Juhasz
Assistant Examiner—Z. R. Bilinsky

[57] ABSTRACT

The invention relates to a ring which is interposed between a collet and a chuck housing to permit the alignment of the collet along the longitudinal axis of the chuck.

2 Claims, 3 Drawing Figures

COLLET-TRUING DEVICE

The invention described herein relates generally to the art of machine tools that employ standard collets to hold pieces of metal or other hard material (generally called the "workpiece") while they are being turned, shaped or otherwise processed. More particularly, the invention provides an improved attachment for use in conjunction with the collet employed in such machines to hold such pieces of metal, the use of which in combination substantially increase the usefullness and scope of operations as well as their capability for precision and accuracy.

More specifically these results are obtained through the provision of an improved collet-truing device by means of which collets that are eccentric in their turning in relationship to the axis of the chuck or other collet-holding device can be "trued" or centered within the axis of said chuck or other collet-holding device.

Heretofore as collets have become eccentric through wear and/or abuse it has been necessary to replace them. The provision of an attachment that provides the means to correct this eccentricity is a distinct advantage in that it facilitates more convenient and economical operation of the machine employing the collet, thereby materially increasing both output and accuracy. The present invention is drawn to such an attachment.

The object of my invention is to provide a means to obtain and insure concentricity of a collet when used in conjunction with my invention as related to the axis of the chuck or other collet-holding device.

A preferred embodiment of my invention whereby I attain the above and other and further objects is illustrated in the accompanying drawings wherein like numerals refer to like parts throughout the several views and wherein FIG. 1 is the plan view of my invention;

Figure 1:
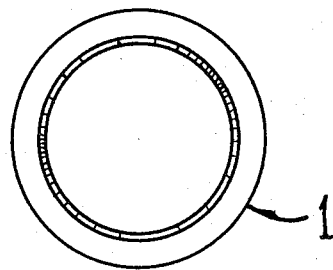
Figure 2:
FIG. 2 is the cross-section of my invention.
Figure 3:
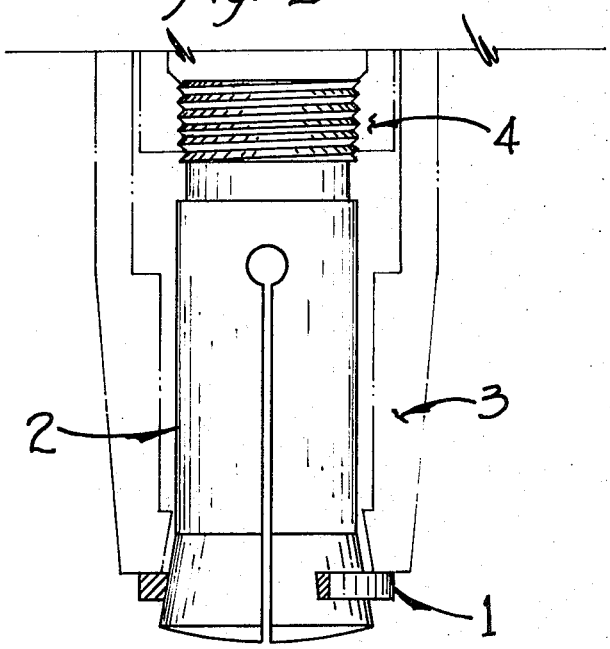
FIG. 3 is a longitudinal view of my invention, partly in section which clearly shows my invention in its relationship to the collet and chuck or other collet-holding device.

My present invention consists of a ring, the diameter of which is determined by the size of the collet with which the collet-truing device is to be used and whose inner diameter face is ground at an angle to correspond to the angle of the tapered outer surface of the collet. The ring is always identified by the numeral "1". The invention 1 is slipped over the collet 2 from the threaded end of the collet 2 so that the tapered angular surfaces of the two parts correspond. The collet 2 is then threaded into the draw-in nut 4 within the chuck or other collet-holding device 3 and the draw-in nut rotated (or tightened) by any suitable means. The workpiece must be inserted into the collet 2 and "centered" by use of an indicator or other instrument suitable for such purpose prior to final tightening of the draw-in nut 4. Final tightening of the draw-in nut 4 with the workpiece held within the collet 2 results in the ring 1, the collet 2, the chuck or other collet-holding device 3 and the draw-in nut 4 becoming fixed or rigid in their relationship with one another. My invention is highly efficient, of simple construction, easily fitted to its collet and the machine employing the collet, and makes possible material reductions in the operating expenses of shops using it.

Adaptations and modifications of my invention will readily suggest themselves to those skilled in the art, and this without departing from the spirit and scope of my invention. Therefore it is my desire to be limited herein by the prior art and the appended claims.

I claim:

1. In a chucking mechanism having a longitudinal axis the combination comprising a collet holding shell having a tapered internal wall and an adjacent planar end face, said end face lying in a plane perpendicular to said longitudinal axis, a resilient collet in said shell, said collet having work gripping jaws and an outer tapered surface adapted to coact with said tapered internal wall upon axial movement of said collet with respect to said shell to effect gripping of a workpiece by said jaws the improvement comprising a collet holding annular ring having planar sides transverse to the ring axis and further including a tapered internal annular surface whereby, upon interposing the ring between the collet and the shell, a planar side of the ring abuts the end face of the shell and the tapered internal surface engages the collet outer taper permitting the lateral movement of the collet with respect to the shell to permit centering of the collet with respect to said mechanism longitudinal axis.

2. A chucking mechanism according to claim 1 wherein the ring internal annular surface is of the same taper as the collet outer taper surface.

* * * * *